United States Patent
Herrmann et al.

(10) Patent No.: US 10,501,128 B2
(45) Date of Patent: Dec. 10, 2019

(54) REAR VIEW DEVICE FOR A VEHICLE

(71) Applicant: SMR Patents S.à.r.l., Luxembourg (LU)

(72) Inventors: Andreas Herrmann, Winnenden-Baach (DE); Urszula Kosidlo, Korntal-Münchingen (DE); Erhart Volker, Köngen (DE)

(73) Assignee: SMR Patents S.à.r.l., Luxembourg (LU)

( * ) Notice: Subject to any disclaimer, the term of this patent is extended or adjusted under 35 U.S.C. 154(b) by 197 days.

(21) Appl. No.: 15/577,231

(22) PCT Filed: May 23, 2016

(86) PCT No.: PCT/IB2016/053009
§ 371 (c)(1),
(2) Date: Nov. 27, 2017

(87) PCT Pub. No.: WO2016/189448
PCT Pub. Date: Dec. 1, 2016

(65) Prior Publication Data
US 2018/0141595 A1 May 24, 2018

(30) Foreign Application Priority Data

May 26, 2015 (EP) .................................. 15169202
Oct. 20, 2015 (DE) ......................... 10 2015 117 836

(51) Int. Cl.
*B62D 35/00* (2006.01)
*B62D 37/02* (2006.01)
(Continued)

(52) U.S. Cl.
CPC ............. *B62D 35/00* (2013.01); *B62D 37/02* (2013.01); *B60R 1/06* (2013.01); *B60R 1/12* (2013.01)

(58) Field of Classification Search
CPC ................................ B62D 35/00; B62D 37/02
(Continued)

(56) References Cited

U.S. PATENT DOCUMENTS 6,979,050 B2 * 12/2005 Browne ................ B62D 35/00
296/180.5
2002/0105742 A1   8/2002 Jeon et al.
(Continued)

FOREIGN PATENT DOCUMENTS

EP       1 281 573 A1    2/2003
WO    2009101001 A1    8/2009

OTHER PUBLICATIONS

European Search Report of the European Patent Office for Patent Application No. 15169202.7, dated Dec. 10, 2015.
(Continued)

*Primary Examiner* — Jospeh D. Pape
(74) *Attorney, Agent, or Firm* — Jones Day (57) ABSTRACT

A rear view device for a vehicle for optimizing airflow includes a spoiler, the spoiler including a flexible surface layer (which is reversibly deformable and which is arranged to cover an opening in a surface of the rear view mirror. The spoiler may include at least one stamp having active material for deforming the flexible surface layer where the at least one stamp is adapted to translate between a retracted and a deployed position.

11 Claims, 6 Drawing Sheets

(51) Int. Cl.
*B60R 1/06* (2006.01)
*B60R 1/12* (2006.01)

(58) Field of Classification Search
USPC .................................................... 296/180.1
See application file for complete search history.

(56) References Cited

U.S. PATENT DOCUMENTS

2003/0048552 A1   3/2003   Martinson
2006/0096365 A1   5/2006   Browne et al.
2008/0128560 A1   6/2008   Hyde et al.

OTHER PUBLICATIONS

International Search Report of the International Searching Authority for PCT/IB2016/053009, dated May 26, 2015.
Written Opinion of the International Searching Authority for PCT/IB2016/053009, dated May 26, 2015.

* cited by examiner

REAR VIEW DEVICE FOR A VEHICLE

CROSS-REFERENCE TO RELATED APPLICATIONS

This application is a national stage entry of International Patent Application No. PCT/IB2016/053009, filed May 23, 2016, which claims the benefit of foreign priority to European Patent Application No. 15 169 202.7, filed May 26, 2015, and German Patent Application No. 10 2015 117 836.2, filed Oct. 20, 2015, each of which is incorporated by reference herein in its entirety for all purposes.

BACKGROUND

1. Field of the Invention

The following description relates to a spoiler for use in an automotive environment for optimizing the airflow of a vehicle. The spoiler may be activated via an active material, such as a shape memory material, and may be covered by a flexible layer. In particular, the following description relates to a rear view device for a vehicle as well as to a system for a vehicle including such a rear view device.

2. Description of Related Art

The use of spoilers is well known in the automotive environment not only for optimizing driving characteristics, such as an improved traction by increasing the downward force of a vehicle, but also for optimizing the air flow. For example, for optimizing the wind resistance and thereby minimizing the energy consumption. Spoilers are not only provided on the front and heck portion of a vehicle. Also, other parts of a vehicle, such as rear-view mirrors, may include spoilers, e.g. for minimizing air turbulences and respective noise.

Spoilers usually have a fixed geometry and can be retractable. Retractable spoilers require actuator elements for deploying and retracting the spoiler and are visible even when in a retracted state due to gaps between the retracted spoiler and the surrounding structure such as a rear part of a car. Such gaps cause air turbulences and respective noise. Also, the actuators cause noise when activated to move the spoiler. In addition, due to the complexity of typical spoilers, integration of the spoilers in smaller vehicle parts, such as the vehicle rear-view mirrors is difficult.

US Patent Application Publication No. 2008/128560 describes a system and a method for deforming surfaces, useful for vehicles utilizing thrust and experiencing drag traveling through an environmental media. A dynamically changing surface geometry on one or more surfaces of a body is created in order to control motion of the body. A sensor provides environmental characteristic information to a respective control system that sends commands to an actuator affecting deformation of a surface dependent on the environmental characteristic information.

International Patent Application Publication No. WO 2009/101001 A1 describes a method for actively deforming an aerodynamic profile, in particular for deforming a wing structure of an aircraft. The aerodynamic profile includes elastic material being able to be deformed by one or more shape memory actuators.

US Patent Application Publication No. 2006/096365 relates to a system that uses an obstacle sensor to provide input for a control unit controlling properties of a surface exposed to a fluid.

US Patent Application Publication No. 2002/105742 A1 relates to a rearview mirror arranged at a trunk lead of a vehicle and having the shape of a spoiler, generating a downward force as does a spoiler.

US Patent Application Publication No. 2003/048552 describes a lateral-view assembly having mirrors coupled to a spoiler of a vehicle.

European Patent Application No. 1 281 573 A2 describes arranging baffle rails at a rearview mirror at a vehicle door for reducing wind noise.

The following description aims at providing an improved spoiler which produces less noise and is less complex than known spoilers.

SUMMARY OF THE INVENTION

In an aspect, a rear view device for a vehicle includes a rear view mirror having a spoiler such as for a vehicle for optimizing airflow. The spoiler includes a flexible surface layer, a stamp for deforming the flexible surface layer and an active material for moving the stamp. The flexible surface layer is reversibly deformable and the stamp deforms the flexible surface layer within a certain limit, namely to ensure that the deformation is reversible. The stamp translates along a substantially straight line and between a retracted and a deployed position. The stamp may not only stay in the final positions "retracted" and "deployed" but also at any intermediate position. This may depend on one or more parameters such as vehicle speed, air pressure, and/or air turbulences. The active material may be adapted to directly or indirectly move the stamp along the straight line.

Moving the stamp along a substantially straight line means that a rotation of the stamp in relation to the flexible surface layer is to be avoided. In this way it is possible to reduce friction between the stamp and the flexible surface layer. This results, among other aspects, in an increased lifetime of the flexible surface layer and may also help to reduce the energy necessary to deform the flexible surface layer. Further, the stamp may have a complexly curved surface which can be better reproduced by the flexible surface layer if the stamp is translated rather than rotated.

The active material may be based on shape memory materials such as electroactive polymers, also known as EAPs. The active material may be composed of interpenetrating polymer network (IPN), and/or conducting polymers (CP), and/or dielectric polymers or be based on carbon materials like carbon nanotubes (CNTs), carbide derived carbon (CDC) and/or graphene and/or be based on Nafion or other ionomers. The active material based on electroactive polymers (EAP) may be ionic or electric in nature. The active material can also be bi-metal actuator or ionic polymer metal composite (IPMC).

The use of active material helps to reduce noise when moving the stamp as compared to known actuators. Also, the use of active material helps to reduce the number of parts necessary for a spoiler. In addition, the use of a flexible surface layer as covering and the elimination of respective gaps or openings helps to avoid that dirt can enter the spoiler.

The stamp itself may include at least some of the active material. In this case only a part of the stamp may translate along a substantially straight line, preferably the part being in contact with the flexible surface layer.

The active material may be provided on one side of the stamp which is opposite from the flexible surface layer. In this way the active material contacts the stamp and may move the stamp.

The active material may be adapted to move an intermediate means which is adapted to move the stamp along the straight line. That is, the active material does not directly but indirectly move the stamp. The intermediate means may have a gear function such as converting a small movement of the active material in a larger movement of the stamp. The gear function may be linear or non-linear.

The active material may also be located on two or more positions in the spoiler. For example, the stamp may include active material and additional active material may be provided on the stamp side opposite from the flexible surface layer. Also, the stamp side which contacts the flexible surface layer may include active material which is, for example, configured to change the surface of the flexible surface layer.

At least one surface of the stamp can be flat or curved. The surface of the stamp which can contact the flexible surface layer and/or the opposite stamp surface may be flat or curved. The surface of the stamp which can contact the flexible surface layer may be a complex surface and the flexible surface layer may be deformed accordingly. That is, the flexible surface layer may at least partially reproduce the shape of the stamp surface.

The spoiler may be completely retractable. In a retracted position of the stamp the flexible surface layer may be undeformed such that the completely retracted spoiler is substantially invisible to an observer. In another example, the stamp may still deform the flexible surface layer in a retracted position but less than in a deployed position. That is, an observer may only see the slightly deformed or undeformed flexible surface layer which may be opaque and/or form a common surface with the surrounding structure such as a part of a vehicle.

In another aspect, a vehicle includes a spoiler according to the invention as well as an activation unit for activating the active material of the spoiler to translate the stamp between retracted and deployed and/or any intermediate position. The system may include a sensor unit for generating control signals for the activation unit. The sensor unit may be adapted to measure one or more of vehicle speed, air pressure and air turbulences. The system may be adapted to perform an ongoing adaptation of the spoiler stamp position to optimize airflow. For example, the stamp in a spoiler on a vehicle may be retracted at slow speed, move to a first deployed position at medium speed, and move to a second deployed position at high speed. The spoiler stamp may be controlled to move to two, three, four, five, six or more discrete positions. In another example, the position of the spoiler stamp may be controlled continuously, i.e. no discrete positions.

The following description also relates to a vehicle including the spoiler. The following description also relates to a rear view device for a vehicle including the spoiler according to the invention.

In an additional aspect, a spoiler in a rear view device for a vehicle for optimizing airflow includes a flexible surface layer which is reversibly deformable and arranged to cover an opening in a surface of the rear view device. The spoiler may include at least one stamp having active material for deforming the flexible surface layer, where the at least one stamp is adapted to translate between a retracted and a deployed position.

The flexible surface layer can be a membrane which is made of any flexible material. The flexible material could be of polymeric nature, such as being made of a thermoplastic elastomer, TPE, or modified thermoplastics with or without additives that influence the flexibility of the material. However, the flexible surface layer could also solely consist of active material, or of a compound material using active material. Also, the flexible material may be arranged to cover an opening in the surface of the rear view device for the vehicle. Here, the term "opening" can be used to refer to a void or to a recess in the surface of the rear view device of the vehicle. The term "surface of the rear view device" is used to refer to the surface of the scalp or the casing of the exterior rear view device which is directly exposed to the surroundings. Also, the scalp or casing could be made of plastic material. The opening could be circular, but could, in another example, also have a different geometrical shape such as being rectangular, etc. The opening could be arranged on any position in the surface. The flexible material can be attached to the surface of the rear view device by injection molding, during, or directly after manufacturing of the plastic component of the rear view device. In another example, the flexible material can be also applied in a second processing step, after the injection molding of the rear view device casing to the surface of the vehicle rear view device. For example, this can be done by gluing, ultrasound bonding, rotational bonding, thermal bonding, soldering, fixing by means of screws etc.

As already described above in reference to other examples, the stamp may not only stay in the final positions "retracted" and "deployed" but also at any intermediate position which may depend on one or more parameters such as vehicle speed, air pressure, and/or air turbulences. The active material can be adapted to directly or indirectly move the stamp along a straight line, along a curved line, or along any path necessary to move the stamp between the retracted and the deployed position. Also, the at least one stamp may include the active material for deforming the flexible surface layer, where the active material causes the stamp to translate between the retracted and the deployed position. Here, the active material may cause at least part of the stamp to translate between the "retracted" and the "deployed" position. For example, the active material may cause the stamp to change its three dimensional shape, e.g. to increase its overall length when being moved in the deployed position. Further, a change in the three dimensional shape may also include that the active material causes at least part of the stamp to bend or to curve when the stamp is translated between the "retracted" and the "deployed" position.

As described above in reference to other examples, the active material may be composed of interpenetrating polymer network (IPN) and/or conducting polymers (CP) and/or dielectric polymers or be based on carbon materials like carbon nanotubes (CNTs) carbide derived carbon (CDC) and/or graphene and/or be based on Nafion or other ionomers. The active material based on electroactive polymers (EAP) may be ionic or electric in nature. The active material can also be bi-metal actuator or ionic polymer metal composite (IPMC). In addition or alternatively, the active material could be a shape memory alloy (SMA), a ferromagnetic shape memory alloy (FSMA), a shape memory polymer (SMP), piezoelectric ceramic, piezoelectric polymer, a magnetostrictor material, like Terfenol-D, or an electrostrictor.

In the retracted position of the stamp, the flexible surface layer may be un-deformed such that the spoiler is substantially invisible to an observer. Whereas, in the deployed position, the stamp may deform the flexible surface layer so that a deformation, such as a ridge like structure, or a bump is formed in the flexible surface layer. The stamp solely include the active material, or may additionally include a second material. For example, the top section of the stamp that deforms the flexible surface layer may include a plastic, metal, and/or ceramic material as the second material. The stamp may be formed of a wire, a block, or a stack and perform a linear motion or a bending motion to translate between the retracted and the deployed position for deforming the flexible surface layer. The term "translating" is used to refer to an increase in length, or a change in the shape of the stamp. In the retracted position, the stamp does essentially not deform the flexible surface layer, whereas in the deployed position, the stamp moves into the flexible surface layer to create a three dimensional deformation, or "bump" in the surface of the flexible surface layer, without tearing the material of the flexible surface layer. Also, the term "deployed position" could be used to refer to an intermediate position, where the stamp deforms the material of the flexible surface layer, but not to the fullest possible extend. As already described in reference to other examples, the surface of the stamp which can contact the flexible surface layer and/or the opposite stamp surface may be flat or curved. The surface of the stamp which can contact the flexible surface layer may be a complex surface and the flexible surface layer may be deformed accordingly. That is, the flexible surface layer may at least partially reproduce the shape of the stamp surface.

The stamp can be actuated by an external stimulus to the active material such as by applying a voltage, by temperature, by humidity, or by some other environmental change. The linear or bending motion of the stamp can be caused from ion or electron movement within the structure of the active material, or from a redox reaction. By using the term "actuating the stamp" it is referred to actuating the active material comprised within the stamp. Therefore, the terms "actuating the stamp" and "actuating the active material" can be used interchangeably.

Advantageously, by employing a stamp which comprises active material for deforming the flexible surface of the spoiler allows to obtain very small spoilers that can be employed in components of the vehicles where with limited space available. This is because larger components like motors or transmissions gears are normally not utilized in the spoilers. Also, the controlled "bump" in the flexible surface layer that is created when the spoiler is activated enhances the aerodynamic properties of the rear view device which results not only in better fuel efficiency, but also reduces noise caused by the rear view device. This is especially true at higher driving speeds. In addition, the spoiler can be activated to remove rain water, snow, residues from washing or any other liquids originating from exterior environmental condition in a controlled way.

In an example, the stamp includes only active material. In this example, the stamp may be formed exclusively of active material. For example, the stamp may be a piece of SMA material, and/or EAP material, in particular an IPN material. In this example, one end of the active material could be held at a fixed spatial position relative to the flexible surface layer by means of a bracket or any other suitable connection, and could move with at least part of its surface into the flexible surface layer while being transferred into the deployed position to create the bump in the flexible surface layer.

In yet another example, the flexible surface layer includes the at least one stamp, with the active material preferably being arranged throughout the entire surface of the flexible surface layer. In this example, the flexible surface layer can be formed solely of the active material. For example, the flexible surface layer could be formed solely of SMA material, and/or EAP material, in particular an IPN material. Advantageously, by using a flexible surface layer that comprises the stamp, no externally fitted stamps need to be employed. Therefore, very flat spoilers can be achieved. In another example, the flexible surface layer may be a membrane which is made of active material.

In an additional example, the spoiler includes at least two stamps. The stamps may be adapted to either deform the active material independently from each other, or synchronously. The at least two stamps can be positioned next to each other in the opening in the surface of the rear view device. Advantageously, by utilizing at least two stamps the deformation of the flexible surface layer can be controlled more accurately. Depending on the geometry of the rear view device, more than two stamps including active material can be used for deforming the flexible surface layer, such as for example a row of stamps might be used, where the stamps are arranged in an opening in the surface of the rear view device that extends along an entire side of the rear view device and which is covered by the flexible surface layer.

In a further example, at least one of the stamps is orientated substantially parallel to the flexible surface layer in the retracted position. Here, the stamp can have a substantially flat rectangular geometry, and could be mounted, for example, with one side or with one of its ends on the inside surface. That is, on the side of the material which is opposite the surface of the rear view device and being arranged to extend with one side at least partially into the opening. Therefore, when the stamp is in the retracted position, the stamp can be located on the inside surface of the rear view device substantially parallel to the surface of the flexible surface layer that is attached to the opposite side of the material. Advantageously, spoilers having very small dimensions can be achieved. Also, as described above with reference to a previous example, more than just one stamp could be included in the spoiler and being orientated substantially parallel to the flexible surface layer in response to being in the retracted position.

In yet another example, at least part of at least one of the stamps moves substantially along a curved line between the retracted and the deployed position. In this example, the stamp could be a bending stamp where the active material within the stamp causes the stamp to bend when actuated. For example, that part of the stamp which is not kept spatially fixed with respect to the flexible surface layer can move substantially along the curved line. Upon application of an external stimulus to the active material, at least part of the stamp, for example, the end of the stamp that extends at least partly into the opening, can start bending towards the flexible surface layer. Here, the curved line can be a line with a light or heavy curvature, where a degree of curvature can run equally or un-equally over the entire length of the line. However, the term "substantially moves along a curved line" could be also used to define a movement which is essentially a translational movement of at least part of the stamp which is arranged to contact the flexible surface layer, whereas the remaining parts of the stamp don't need to perform that translational movement.

During this process, the stamp can start to exert a force to the inner surface of the flexible material which is facing the interior of the rear view device and thus can cause the flexible material to deform in the exterior direction. Advantageously, this force and, hence, the resulting deformation will result in the controlled "bump" in the flexible surface layer.

In an example, at least part of at least one of the stamps moves substantially along a straight line between the retracted and the deployed position. Here, the term "moving" is used not only to refer to a change in location, but also to an increase in length, or to an expansion of the stamp.

However, the stamp may not only remain in the final positions "retracted" and "deployed", but also at any intermediate position. This may depend on one or more parameters such as vehicle speed, air pressure, and/or air turbulences. Therefore, the active material of the stamp could, for example, cause an increase in the overall length of the stamp in response to being deployed, so that the top side of the third stamp moves into the flexible layer to create the controlled "bump". Also, "moving along a straight line" could be used to refer to a situation where the top part of the stamp that deforms the flexible surface layer moves along the straight line, and the active material performs a bending motion to move the top part of the stamp along the straight line.

The spoiler may be completely retractable. In a retracted position of the stamp the flexible surface layer may be undeformed such that the completely retracted spoiler is substantially invisible to an observer. Alternatively, the stamp still deforms the flexible surface layer in a retracted position but less than in a deployed position. That is, an observer may only see the slightly deformed or undeformed flexible surface layer which may be opaque and/or form a common surface with the surrounding structure such as a part of a vehicle.

In an example, the active material is an electroactive polymer (EAP) material, in particular, including an interpenetrating polymer network (IPN), a conducting polymer (CP), a dielectric polymer, carbon nanotubes (CNTs), a carbide derived carbon (CDC), Graphene, Nafion, and combinations thereof, preferably the active material based on EAP material is ionic or electric in nature, and/or wherein the active material comprises a shape memory alloy (SMA), a ferromagnetic shape memory alloy (FSMA), a shape memory polymer (SMP), a bi-metal actuator, an ionic polymer composite (IPMC), a piezoelectric ceramic, a piezoelectric polymer, an electrostrictor, a magnetorestrictor, in particular comprising Terfenol-D, and/or combinations thereof.

In a further aspect, a system, such as for a vehicle, includes a spoiler according to the invention as well as an activation unit for activating the active material of the spoiler to translate the stamp between retracted and deployed and/or any intermediate position. The system may include a sensor unit for generating control signals for the activation unit. The sensor unit may be adapted to measure one or more of vehicle speed, air pressure and air turbulences. The system may be adapted to perform an ongoing adaptation of the spoiler stamp position to optimize airflow. For example, the stamp in a spoiler according to the invention on a vehicle may be retracted at slow speed, move to a first deployed position at medium speed, and move to a second deployed position at high speed. The spoiler stamp may be controlled to move to two, three, four, five, six or more discrete positions. Alternatively, the position of the spoiler stamp may be controlled continuously, i.e. no discrete positions.

The following description also relates to a system for a vehicle including at least one spoiler according to the invention and an activation unit for activating the at least one stamp of the at least one spoiler for deforming the flexible surface layer. The system may also include a sensor for generating control signals for activating the stamp. The sensor may be adapted to measure one or more parameters such as the vehicle speed, the air pressure and/or air turbulences. The system may be adapted to perform an ongoing adaptation of the spoiler to optimize airflow. For example, the stamp can be retracted so as to not deform the flexible surface layer at slow speeds and to gradually move into the deployed position where the flexible surface layer gets deformed at higher speeds. Also, the system might control more than one stamps in one spoiler, and/or the system might control more than just one spoilers which are included in the rear view device.

The invention also relates to a rear view device for a vehicle comprising at least one spoiler according to the invention. Also, more than just one spoiler, for example at least two spoilers, could be comprised in the rear view device. For example, multiple spoilers could be linearly placed in the rear view device. Here, the term "linearly placed" is used to refer to a placement in a row that is orientated essentially perpendicular to the driving direction. Also, the spoilers could be controlled to synchronously or asynchronously translate between the retracted and the deployed position. Advantageously, by employing more than just one spoiler the spoiler surface can be enlarged and the performance of the resulting spoiler can be more accurately controlled.

Also, in an example of the rear view device, the rear view device includes at least two spoilers, and the flexible surface layer is arranged in one single piece on at least two openings of the at least two spoilers in the surface of the rear view device. Here, the flexible surface layer may span over an entire side of the rear view device, such as being arranged on the top side of the rear view device which faces in the upwards direction to form a common surface with the surrounding structure. Advantageously, by using one single piece of flexible material to cover the opening of the individual spoilers, an even surface can be achieved on the side of the rear view device where the spoilers are located. Furthermore, the term "being arranged in one single piece" may also be used to refer to an arrangement where the flexible material is over-molded on the plastic material of the rear view device. Advantageously, in the latter case the flexible material also remains at the same level as the plastic material of the vehicle mirror.

The invention also relates to a vehicle having the spoiler according to the invention. The invention also relates to a rear view device for a vehicle having the spoiler according to the invention.

BRIEF DESCRIPTION OF THE DRAWINGS

The following schematic drawings show aspects of the invention for improving the understanding of the invention in connection with some exemplary illustrations, wherein.

DETAILED DESCRIPTION

Figure 1:
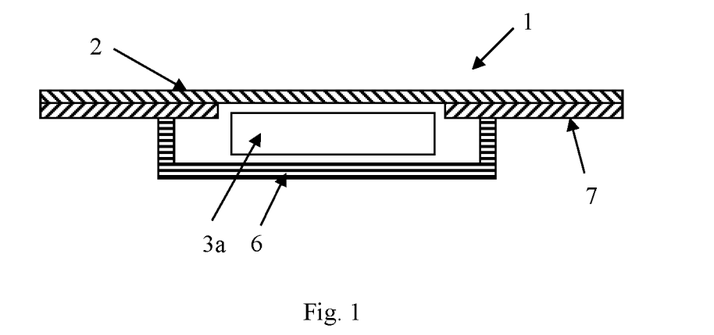
FIG. 1 shows a schematic cross sectional view of a spoiler according to an example of the invention.

The spoiler 1 as illustrated in FIG. 1 shows a flexible surface layer 2 which is applied to a structural part 7 such as a frame, e.g. of a front, rear or side portion of a vehicle or a rear-view mirror of a vehicle. A movable stamp 3a translates between a retracted position as illustrated and a deployed position (see dashed lines in FIG. 3). The structural part 7 has an opening so that the stamp 3a can contact and deform the flexible surface layer 2. The stamp 3a is driven by an active material 6 which may be provided externally to the stamp 3a. For example, on the side of the stamp 3a which is opposite from the flexible surface layer 2. The active material 6 can be controlled to deform in order to move the stamp 3a in a desired manner.

Figure 2A:
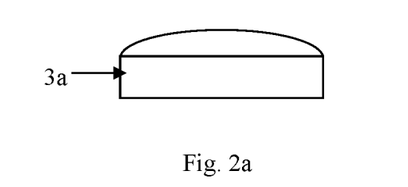
FIGS. 2a and 2b shows a schematic cross sectional view of a stamp of a spoiler according to another example of the invention.
Figure 2B:
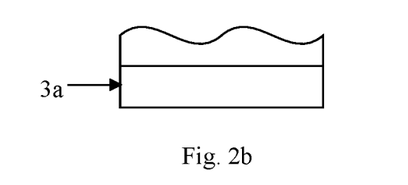

FIGS. 2a and 2b show schematic cross sectional views of a stamp 3a of a spoiler. The stamp 3a of FIG. 2a has a surface which is elliptically-like curved. If the stamp 3a is orientated such that the latter surface contacts the flexible surface layer 2, the flexible surface layer may reproduce the shape of the stamp 3a when the latter is in a deployed position. In other words, the flexible surface layer 2 at least partially assumes the shape of the elliptically like curve. The same is true for other surfaces like the one shown in FIG. 2b. It is noted that much more complex surfaces are possible. This is due to the fact that stamp 3a translates between the retracted and deployed position instead of rotating.

Figure 3:
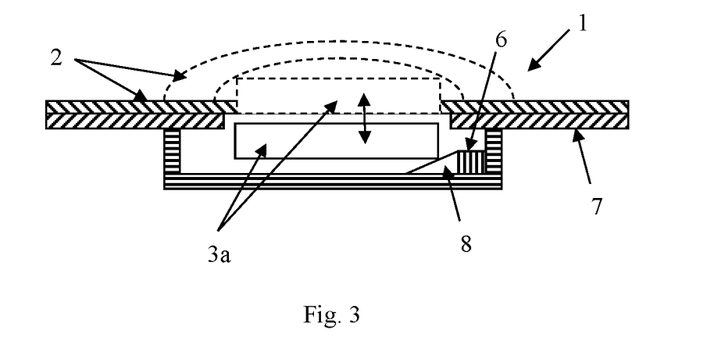
FIG. 3 shows a schematic cross sectional view of a spoiler according to yet another example of the invention with an intermediate member.

In FIG. 3, a schematic cross sectional view of a spoiler with an intermediate member 8 is illustrated. The active material 6 is located to move the intermediate member 8. The intermediate member 8 in turn moves the stamp 3a between the retracted and deployed position (dashed lines). For example, the intermediate member 8 is v-shaped and adapted to covert a small movement of the active material 6 into a larger movement of the stamp 3a. The intermediate member 8 can be designed such that a movement of the active material 6 is translated in a linear manner or in a non-linear member.

Figure 4A:
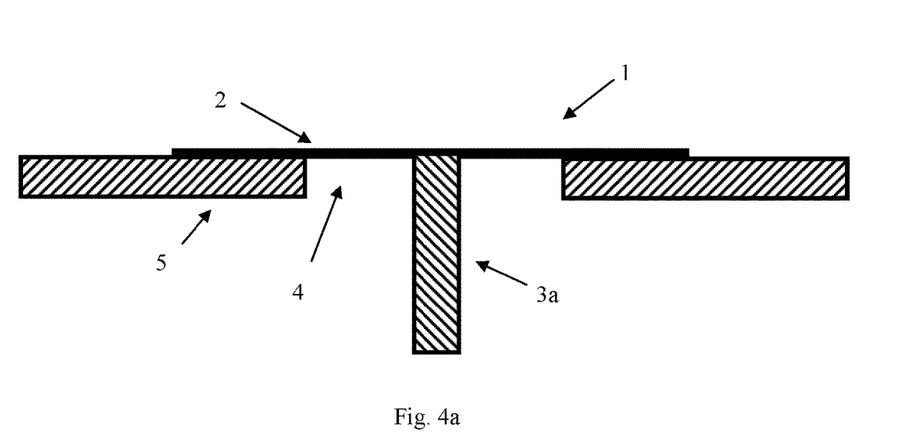
FIGS. 4a and 4b show schematic cross sectional views of a spoiler according to an example of the invention with the stamp in the retracted and in the deployed position, where the stamp moves along a straight line.

FIG. 4a shows an example of a spoiler 1, where a flexible surface layer 2 is arranged to cover an opening 4 in the surface 5 of a rear view mirror. In FIG. 4a, a stamp 3a having active material is shown in the retracted position. Upon the application of an external stimulus to the active material, e.g. the application of a voltage, the active material included in the stamp 3a causes a liner motion of the stamp 3a towards the flexible surface layer 2. The stamp 3a, e.g. the end of the stamp 3a that points away from the flexible surface layer 2 might be kept stationary with regards to the flexible surface layer 2 by use of a bracket, or by some other appropriate means (not shown in FIGS. 4a, 4b).

Figure 4B:
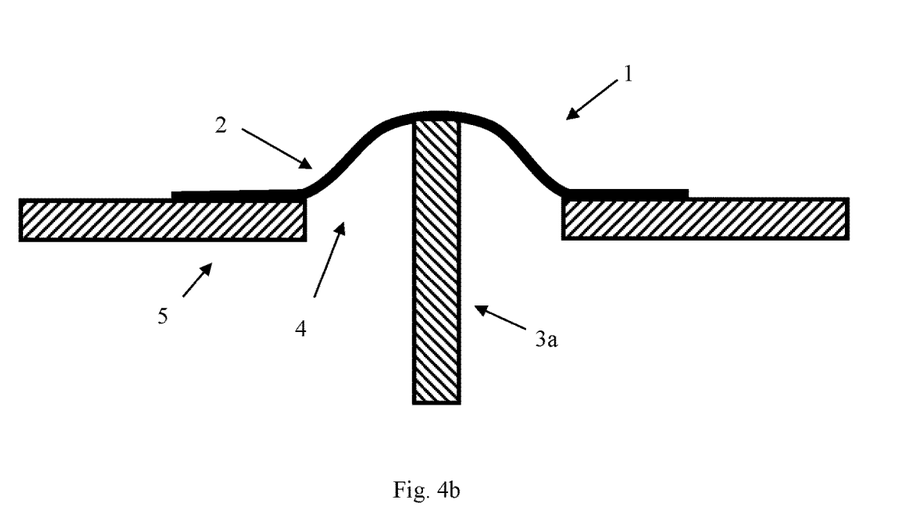

The distance between the stamp 3a in a non-activated state and the flexible surface layer 2 is such that after application of the external stimulus, the linear elongation of the stamp 3a will exceed that distance. As a result, the stamp 3a generates a force on the flexible surface layer 2 from below the flexible surface layer 2, e.g. from the inside of the rear view mirror, and causes the flexible surface layer 2 to deform in an outward direction when the stamp 3a is in the deployed position as shown in FIG. 4b.

Figure 5A:
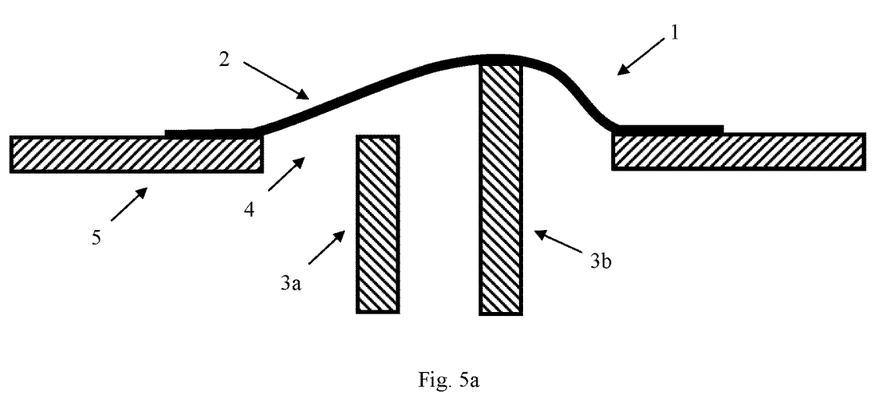
FIGS. 5a, 5b, and 5c show schematic cross sectional views of a spoiler according to an example of the invention, where the spoiler comprises at least two stamps, and where the stamp moves along a straight line.
Figure 5B:
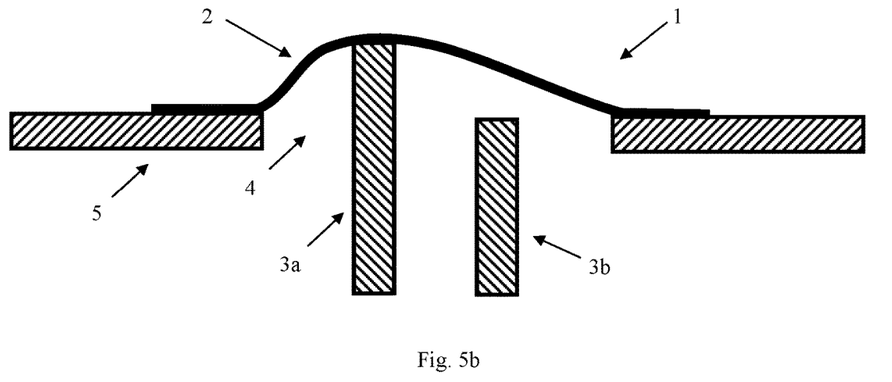
Figure 5C:
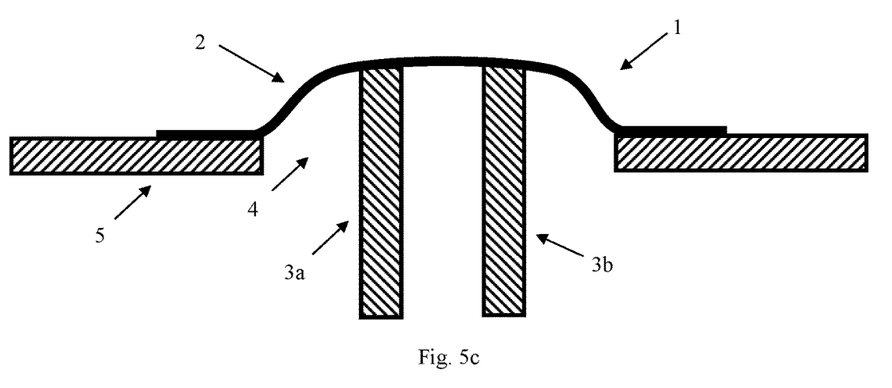

FIGS. 5a, 5b, 5c show schematic cross sectional views of a spoiler 1 according to another example of the invention. The spoiler 1 includes at least two stamps 3a, 3b, and where the stamps 3a, 3b move along a straight line. In the examples that are shown in FIGS. 5a, 5b, 5c, two stamps 3a, 3b can act on the flexible surface layer 2. For example, FIG. 5a shows a situation where a deformation, or bump, in the flexible surface layer 2 is created on the right side of the flexible surface layer 2. Whereas, in FIG. 5b, the bump is located on the left side of the flexible surface layer 2. In the example that is shown in FIG. 5c, one large deformation or bump is created. The location and intensity of the deformation can be controlled by the stamps 3a, 3b as shown in FIGS. 5a, 5b, 5c being in either the retracted or in the deployed position. However, the skilled person would understand that the stamps 3a, 3b could also assume an intermediate position, i.e. a position between the retracted and the deployed position to create the deformation. Also, the skilled person would understand that more than two stamps 3a, 3b can be used to deform the flexible surface layer 2.

Figure 6A:
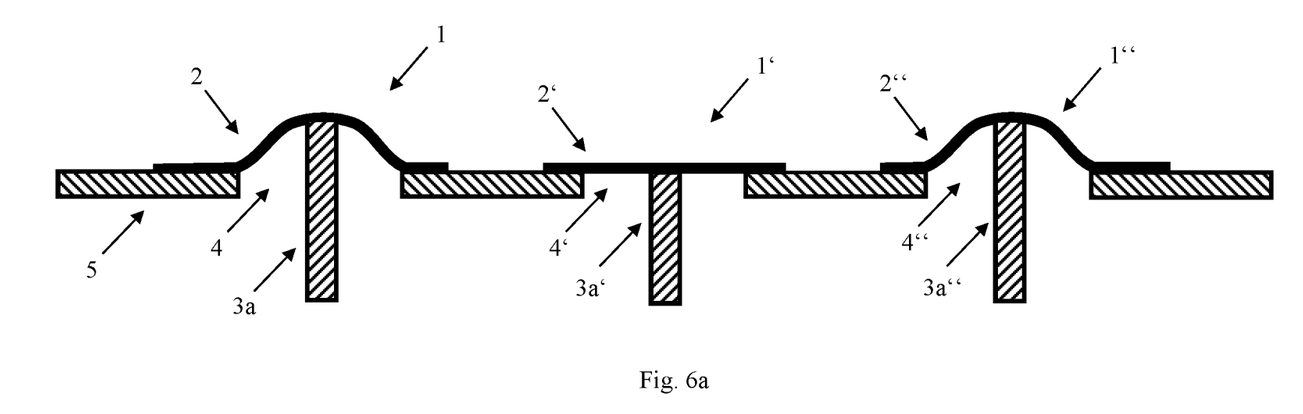
FIGS. 6a and 6b show schematic cross sectional views of the placement of multiple spoilers according to another example of the invention.
Figure 6B:
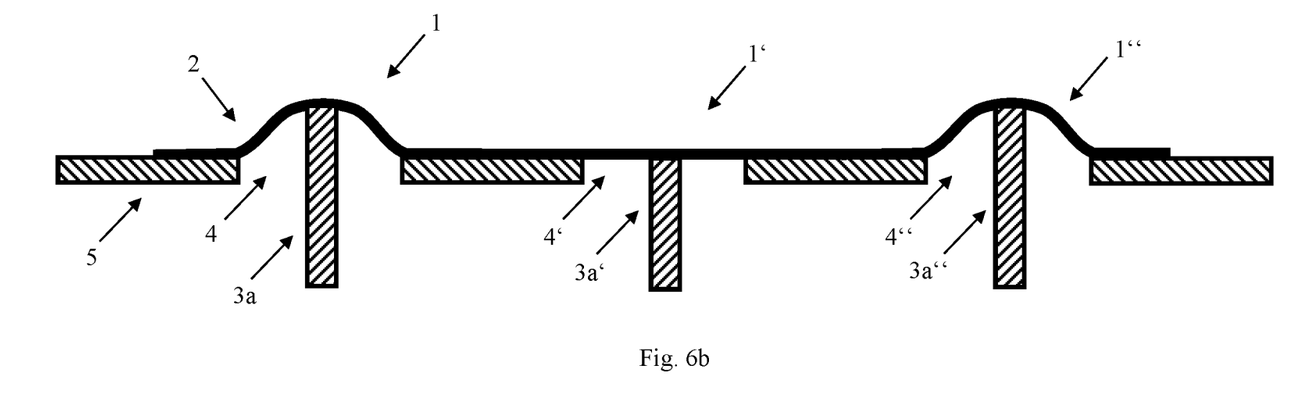

FIGS. 6a and 6b show schematic cross sectional views of the placement of multiple spoilers 1, 1', 1" according to another example of the invention. In FIG. 6a an example is shown where the flexible surface layer 2, 2', 2" of each spoiler 1, 1', 1" is arranged to just cover the opening 4, 4', 4" in which the respective spoilers 1, 1', 1" are mounted. In the example that is shown in FIG. 6b, one single piece of flexible surface material 2 is arranged to cover all openings 4, 4', 4". As it can be seen from FIG. 6b, an even surface can be achieved on the surface of the rear view mirror in which the spoilers 1, 1', 1" are located. FIGS. 6a and 6b show an example where three spoilers 1, 1', 1" are arranged in corresponding openings 4, 4', 4" located in one horizontal row in the surface 5 of the rear view mirror. However, the skilled person would know that more or less spoilers 1, 1', 1" can be arranged in corresponding openings 4, 4', 4" which might be dispersed on the surface 5 of the rear view mirror surface in any possible configuration.

Figure 7A:
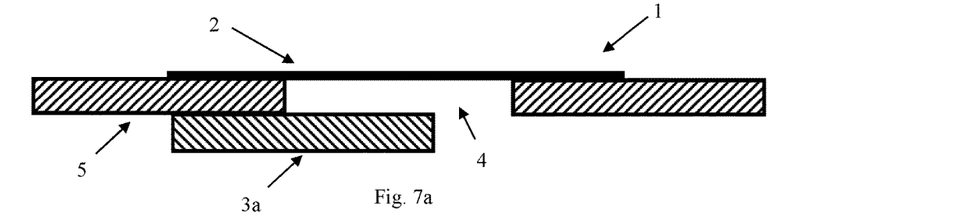
FIGS. 7a and 7b show schematic cross sectional views of a spoiler according to another example of the invention with the stamp in the retracted and in the deployed position, where the stamp moves along a curved line.
Figure 7B:
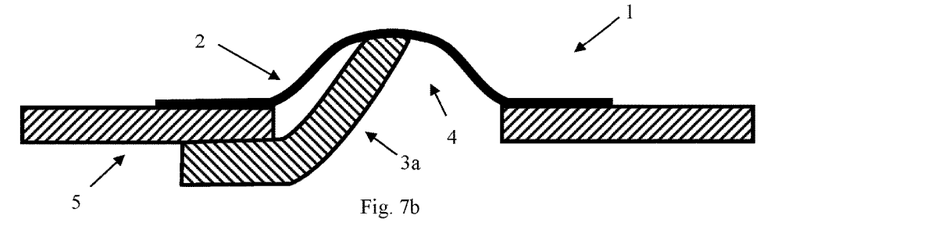
Figure 7C:
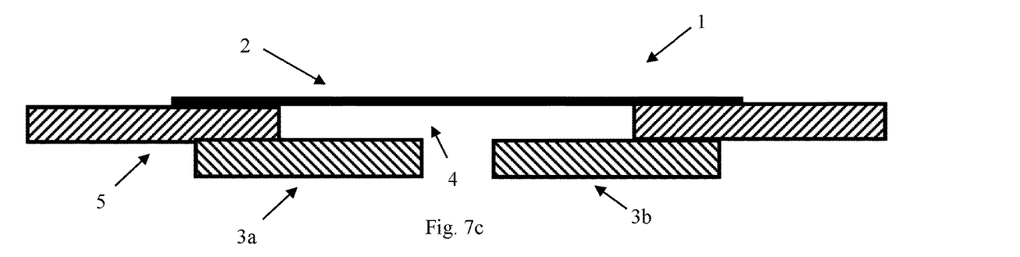
FIGS. 7c and 7d show schematic cross sectional views of a spoiler according to an example of the invention with the stamp in the retracted and in the deployed position, where the spoiler comprises at least two stamps, and where the stamps move along a curved line.
Figure 7D:
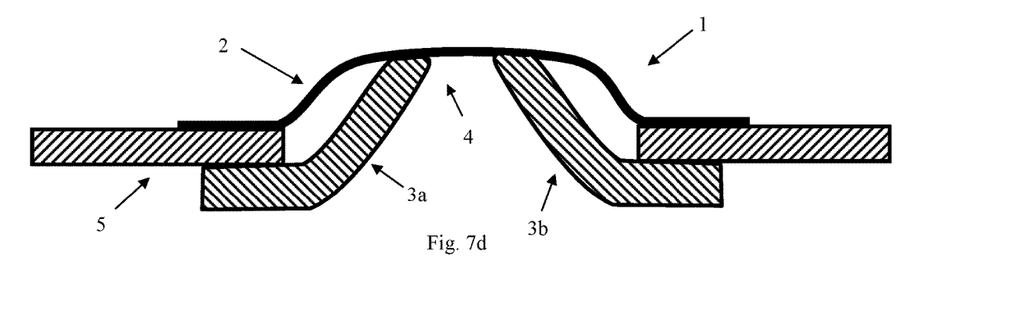

FIGS. 7a and 7b show schematic cross sectional views of a spoiler 1 according to another example with a stamp 3a in the retracted and in the deployed position. In the shown example, the stamp 3a moves along a curved line. As illustrated in FIG. 7a, the stamp 3a is orientated substantially parallel to the flexible surface layer 2 when it is in the retracted position. FIG. 7b shows the stamp 3a in the deployed position when the stamp 3a, or one end of the stamp 3a that extends at least partly into the opening 4 is bending towards the flexible surface layer 2, and thus can deform the flexible surface layer 2 to create a deformation or bump. Also, as shown in FIGS. 7c and 7d, more than just one stamp 3a could be included in the spoiler 1 and may be orientated substantially parallel to the flexible surface layer 2 when in the retracted position, and bending the flexible surface layer 2 in the deployed position. In the shown example, two stamps 3a, 3b are employed. However, a person having ordinary skill in the art should appreciated that more than two stamps 3a, 3b can be utilized in the spoiler 1.

Also, as it can be seen in FIGS. 7a to 7d, the installation height of the spoiler 1 is drastically decreased compared to the spoilers 1 that are shown in the FIGS. 4 to 6.

Figure 8A:
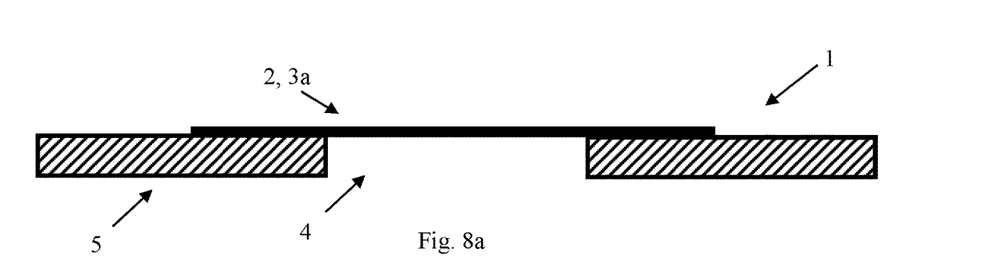
FIGS. 8a and 8b show schematic cross sectional views of spoiler according to another example of the invention with the stamp in the retracted and in the deployed position, where the stamp is comprised within the flexible layer.
Figure 8B:
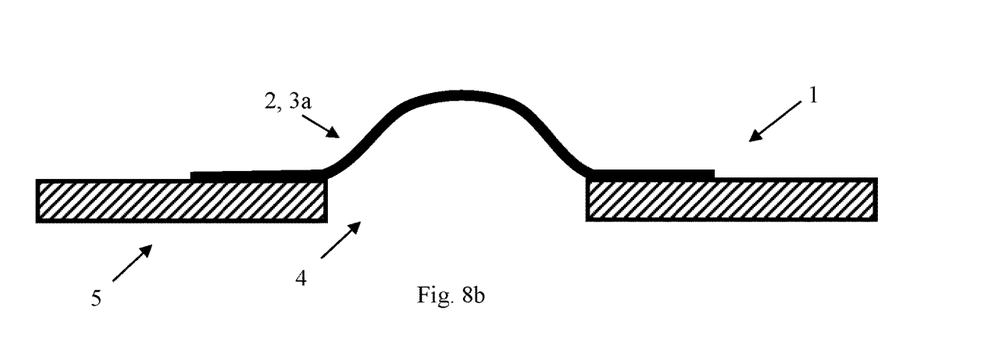

FIGS. 8a, 8b show schematic cross sectional views of a spoiler 1 according to another example with the stamp 3a in the retracted and in the deployed position. In the shown example, the stamp 3a only includes active material that is arranged throughout the entire surface of the flexible surface layer 2. In the figure that is shown, the flexible surface layer 2 is a membrane which is made of active material.

Also, the skilled person would understand that the membrane could be applied to a closed surface 5 of the rear view mirror. In other words, no opening 4 needs to be located below the stamp 3a which is included within the flexible layer 2.

REFERENCE SIGNS 1, 1', 1" spoiler
2, 2', 2" flexible surface layer
3a, 3a', 3a", 3b stamp
4, 4', 4" opening
5 surface of rear view mirror
6 active material
7 structural part
8 intermediate means

What is claimed is:

1. A rear view device for a vehicle comprising a spoiler for optimizing airflow, the spoiler comprising:
   a flexible surface layer which is reversibly deformable and which is arranged to cover an opening in a surface of the rear view device; and
   at least one stamp comprising active material for deforming the flexible surface layer, wherein the at least one stamp is adapted to translate between a retracted and a deployed position.

2. The rear view device of claim 1, wherein the at least one stamp comprises only active material.

3. The rear view device of claim 2, wherein the flexible surface layer comprises the at least one stamp with the active material being arranged throughout the entire surface of the flexible surface layer.

4. The rear view device of claim 2 or 3, wherein the flexible surface layer is a membrane which is made of active material.

5. The rear view device of claim 1, wherein the spoiler comprises at least two stamps.

6. The rear view device of claim 1, wherein at least one of the at least one stamp is orientated substantially parallel to the flexible surface layer in the retracted position.

7. The rear view device of claim 1, wherein at least part of at least one of the at least one stamp moves substantially along a curved line between the retracted and the deployed position.

8. The rear view device of claim 1, wherein at least part of at least one of the at least one stamp moves substantially along a straight line between the retracted and the deployed position.

9. The rear view device of claim 1, wherein at least one of
   the active material is an electroactive polymer (EAP) material comprising at least one of an interpenetrating polymer network (IPN), a conducting polymer (CP), a dielectric polymer, carbon nanotubes (CNTs), a carbide derived carbon (CDC), Graphene, Nafion, and combinations thereof;
   the active material based on EAP material is ionic or electric in nature; and
   the active material comprises at least one of a shape memory alloy (SMA), a ferromagnetic shape memory alloy (FSMA), a shape memory polymer (SMP), a bi-metal actuator, an ionic polymer composite (IPMC), a piezoelectric ceramic, a piezoelectric polymer, an electrostrictor, a magnetorestrictor comprising Terfenol-D, and combinations thereof.

10. The rear view device of claim 1, wherein the rear view device comprises at least two spoilers, and the flexible surface layer is arranged in one single piece on at least two openings for the at least two spoilers in the surface of the rear view device.

11. A system for a vehicle, comprising
   the rear view device according to claim 1; and
   an activation unit for activating the at least one stamp of the at least one spoiler for deforming the flexible surface layer.

* * * * *